INVENTOR.
PAUL I. PETERSEN

March 15, 1966  P. I. PETERSEN  3,240,350
SEDIMENTATION TANK HAVING ROTATABLE
SEDIMENT CONVEYING STRUCTURE
Filed Nov. 19, 1962  4 Sheets-Sheet 4

INVENTOR.
PAUL I. PETERSEN
BY Theodore M. Jablon
ATTORNEY.

United States Patent Office 3,240,350
Patented Mar. 15, 1966

3,240,350
SEDIMENTATION TANK HAVING ROTATABLE
SEDIMENT CONVEYING STRUCTURE
Paul Ingemann Petersen, Mount Vernon, Ohio, assignor to Dorr-Oliver Incorporated, Stamford, Conn., a corporation of Delaware
Filed Nov. 19, 1962, Ser. No. 238,570
4 Claims. (Cl. 210—531)

This invention relates to continuously fed sedimentation apparatus wherein a driven rotary sediment conveying structure moves the sediment or sludge continuously over the tank bottom of a settling tank to an outlet means while a supernatant liquid overflows continuously from the tank.

More particularly, the invention is concerned with improvements in a type of sedimentation apparatus wherein the sediment conveying structure comprises a vertical shaft supported from a main drive gear structure or the like coaxial therewith, where the gear structure is mounted for rotation in a casing means supported relative to the tank. Rotation of the shaft causes the rake means or the like carried thereby to move sediment to the outlet means.

Furthermore, in the type of sedimentation apparatus herein contemplated, means are provided for enabling the operator to raise the sediment conveying structure from the tank bottom for instance in order to overcome undue sludge accumulation of sludge load on the rake means, and thereafter to lower the structure again to its normal operating position relative to the bottom of the tank. Therefore, the drive mechanism for the sediment conveying structure comprises a rotary drive gear structure wherein the shaft member is axially shiftable, which drive gear structure may comprise a main gear driven by a worm.

It is one of the objects of this invention to provide improved and efficient drive means for the sediment engaging structure whereby a balanced torque may be applied from the main drive gear structure to the shaft, even though the shaft be axially shiftable therein, so as to enable the shaft to be shifted freely in an axial direction when raising or lowering the sediment engaging means even when the same are operating under load.

It is also among the objects to provide in this type of apparatus an improved drive mechanism for the rake structure, having extremely simple and effective balanced torque transmitting means of great compactness, and which are easily accessible and readily assembled, and which because of their simplicity and compactness minimize production costs.

With the foregoing objects in view, this invention provides a plurality of sets of torque transmitting elements of circular cross-section loosely confined between a drive gear structure and a shaft structure, surrounded by substantially conforming mutually complementary grooves formed in the respective structures parallel to the shaft axis which sets of torque transmitting members cooperate, by interbalance, to transmit a balanced drive torque from the gear structure to the shaft structure and to the sediment conveying means thereon, while permitting free axial movement of the shaft.

With this invention, an arrangement of only two sets of such torque transmitting elements need be provided for establishing a balanced driving torque. However, for instance a triple track arrangement wherein there are three sets of such torque transmitting elements, may be advantageously employed, for example, for handling larger torques.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 1:
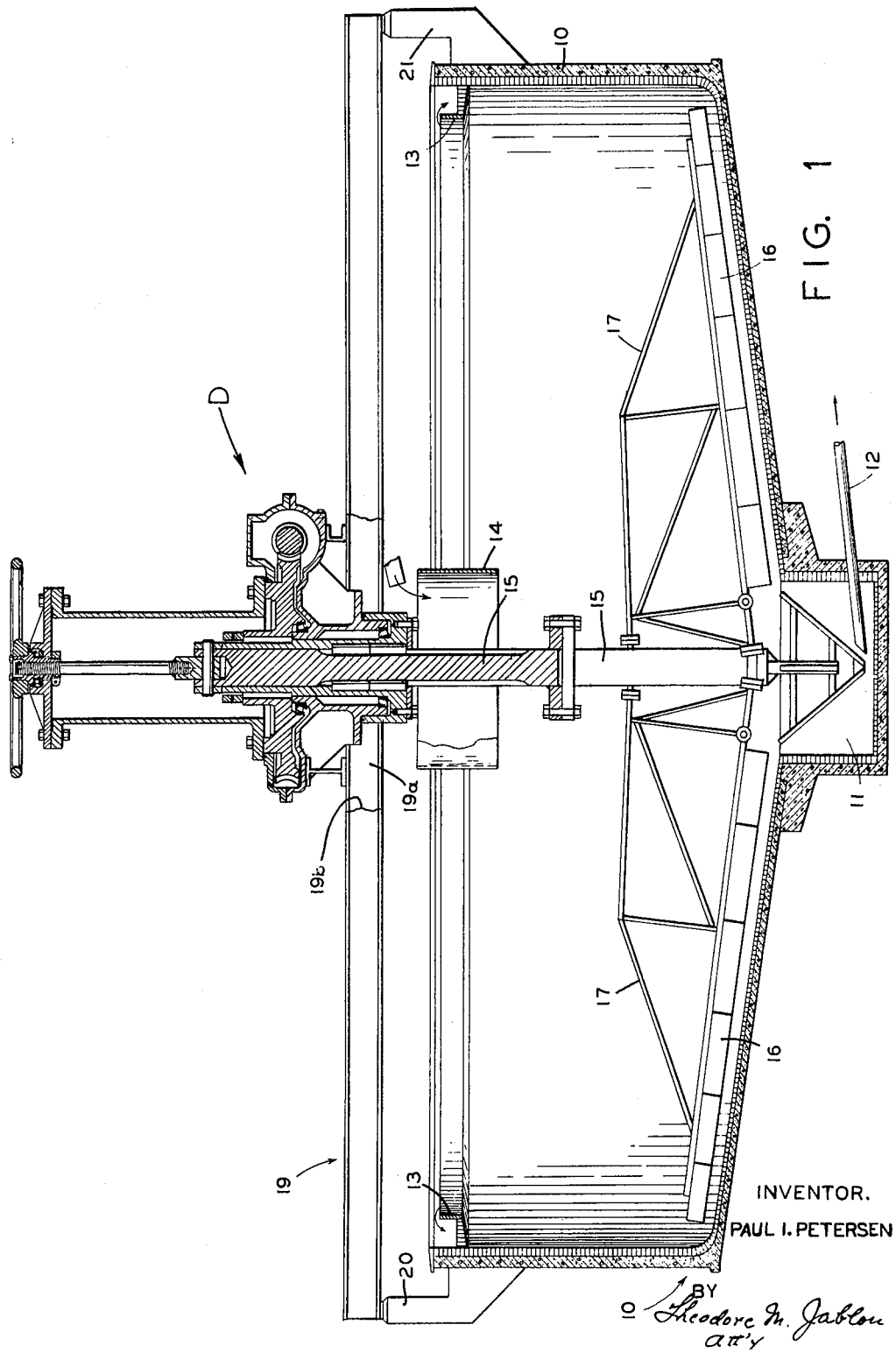
FIG. 1 is a general view in vertical section of a sedimentation apparatus embodying the invention, featuring the loosely mounted torque transmitting member in the drive mechanism for establishing a balanced torque.

As illustrated in the example of FIG. 1, the invention is embodied in a sedimentation apparatus comprising a round settling tank 10 having a shallow conical bottom provided with central sump 11 receiving sediment or sludge conveyed thereto over the bottom by rotary sludge conveying means, having a sludge withdrawal conduit or pipe 12 leading from the sump.

The tank wall is provided at the top end with an overflow launder 13 receiving clarified liquid, and with a discharge means therefor not shown. A feed suspension or slurry is delivered continuously into a cylindrical feedwell 14 located centrally of the tank and surrounding the vertical shaft 15 of a rake structure which has sediment conveying means or raking blades 16 carried by rake arms 17 extending from the lower end portion of the shaft. The rake structure when rotated is effective to convey the sediment or sludge over the tank bottom into the sump for withdrawal through pipe 12, while clarified liquid overflows into launder 13.

Supporting structure 19 for the sediment conveying apparatus may be in the form of a bridge construction spanning the tank, preferably comprising a pair of parallel beams 19a and 19b extending across the top of the tank, the beams being shown supported at their respective ends by respective columns 20 and 21 or the like.

The sediment raking apparatus of this invention with improved drive mechanism D comprising novel means for attaining a self-balancing driving torque, is mounted on the bridge construction 19, with the shaft of this structure arranged for axial movement in order that the rake means may be raised or lowered relative to the bottom of the tank.

Figure 2:
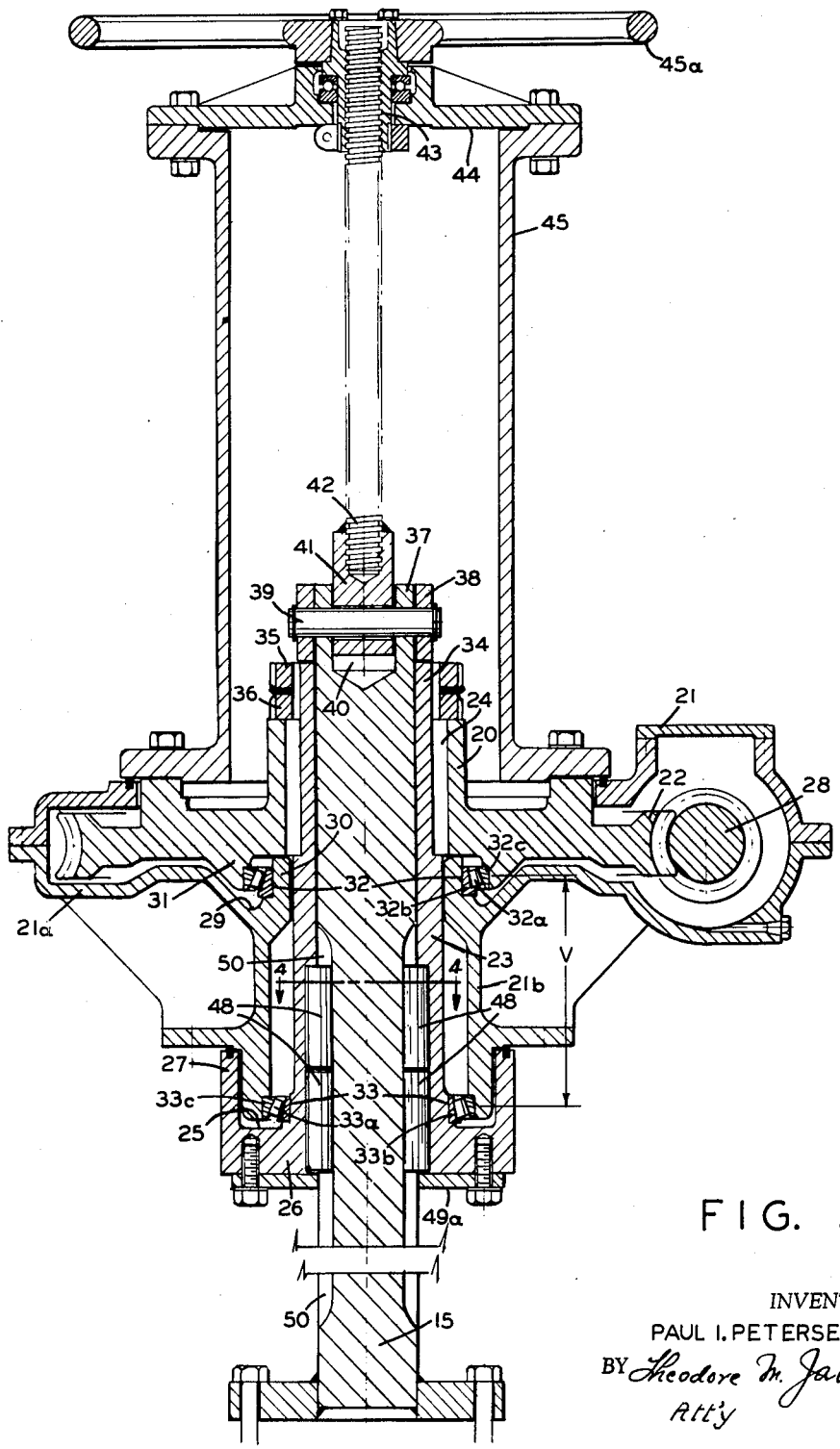
FIG. 2 is a greatly enlarged vertical sectional view of the improved mechanism shown in FIG. 1, presenting one embodiment of the invention with respect to the arrangement of the torque transmitting means.

Referring more particularly to the enlarged view in FIG. 2 of drive mechanism D, the shaft of the rake structure is shiftable in a gear or gear structure 20 which in turn is mounted for rotation in a gear casing 21 preferably in the manner disclosed in copending patent application of Cookney and Petersen, Serial No. 204,809, filed June 25, 1962. In this gear structure a worm gear 22 is fixed to the upper end portion of a sleeve member 23 as indicated by key connection 24. The lower end portion of the sleeve member is formed with an external annular trough 25 comprising the bottom portion 26 and a peripheral wall portion 27 rising from the bottom portion 26.

The gear casing comprises an upper shallow portion 21a surrounding the drive gear proper, and also accommodating a worm member 28 engaging the worm gear 22 for rotating the same. Power drive for the worm member is here not shown. This upper casing portion has a narrower downward cylindrical extension or lower casing portion 21b terminating within the annular space defined by the aforementioned annular trough 25 formed by the sleeve member of the gear construction.

At the juncture of the upper and the lower casing portions, the casing is formed with an inner annular trough 29 having an inner peripheral wall 30. The gear 22 in turn is formed at the underside thereof with an annular ridge portion 31 extending into the annular trough.

The gear structure is mounted for rotation in the casing by means of an upper conical roller bearing 32 cooperating with a lower conical roller bearing 33, both roller bearings having upwardly converging roller axes, and being spaced a substantial vertical distance V one from the other, thereby providing a stable base in conjunction with certain means for adjusting bearing tolerance described below. In this embodiment, the vertical distance between the two bearings is utilized to accommodate at least a substantial portion of the vertical extent of the torque transmitting elements.

More particularly, the upper bearing 32 located within the upper annular trough 29 has conical rollers 32a operating between an inner race member 32b seated around the aforementioned inner peripheral wall 30 of the casing and an outer race member 32c seated within the annular depending ridge portion 31 of the gear. The annular troughs 25 and 29 are kept filled with lubricating oil, thus providing an oil bath for the respective bearings 32 and 33 located therein.

The lower bearing 33 located within the lower annular trough, comprises conical rollers 33a operating between an inner race member 33b seated around the lower end of the sleeve member of the gear structure, and an outer race member 33c seated within the lower end portion of the casing.

The sleeve member of the gear construction has an upper externally threaded extreme end portion 34 extending somewhat beyond the top face of the hub of gear 22, far enough to accommodate a pair of locknuts 35 and 36 tightened against said top face of the hub only sufficient to insure proper operating tolerance in the bearings 32 and 33.

The shaft 15 of the rake structure in turn has an extreme upper end portion 37 extending somewhat beyond the top end face of the sleeve member, and surrounded by and connected to a stop ring 38 adapted to rest upon the top face of the sleeve member when the rake structure is in its lowermost operating position.

A pin member 39 extends transversely through the stop ring 38 securing the same to the shaft. The pin member 39 also extends transversely through an axial recess 40 provided in the top end face of the shaft, and is surrounded by anchoring member 41 fixed to the lower end of a screw spindle 42. At its upper end, the screw spindle is engaged by an actuating nut 43 mounted for rotation in a supporting plate member 44 wherein the nut is secured against axial displacement. This plate member is mounted to close the top end of a vertical hollow or tubular member 45 mounted upon and fixed to the drive gear 22. The actuating nut may be rotated in any suitable manner for imparting axial movement to the spindle whereby the rake structure may be either raised or lowered. The rotation of the nut may be effected by any suitable means such as a power drive, although a hand wheel 45a is here shown for manual operation.

According to the invention, balanced drive torque is transmitted from drive gear 22 to shaft 15 of the rake structure by means of a plurality of sets of torque transmitting members loosely confined between the gear construction. The torque transmitting elements are circular in cross section, and may be in the form, for instance, of cylindrical or spherical bodies.

In the embodiment of FIG. 2, furthermore, the torque transmitting elements are caged within the lower portion of the sleeve member of the gear construction. As clearly illustrated in the enlarged cross-sectional view of FIG. 3, there are provided a minimum of two sets 46 and 47 of torque transmitting elements, each set comprising one or more torque transmitting bodies or elements 48 (see FIG. 2) of equal circular configuration. In each set of torque transmitting elements, one side thereof lodges in a slightly oversized inwardly facing groove 49 formed in the sleeve member to extend parallel to the shaft axis, which groove has a profile of semicircular configuration. In these inwardly facing grooves, the elements 48 are endwise confined with a closure plate or retainer member 49a removably fastened to the bottom end face of the sleeve. The other side of the torque transmitting elements 48 of each set lodges in a substantially conforming outwardly facing complementary groove 50 formed in the shaft, which complementary grooves having a profile of semicircular configuration are also slightly oversized and of a depth substantially equal to the depth of the associated grooves 49. The outwardly facing grooves 50, of course, are of considerably greater length than the associated grooves 49, inasmuch as they must serve as tracks wherein the elements 48 may slide incident to the axial movement of the shaft when raising or lowering the rake conveying means.

Figure 3:
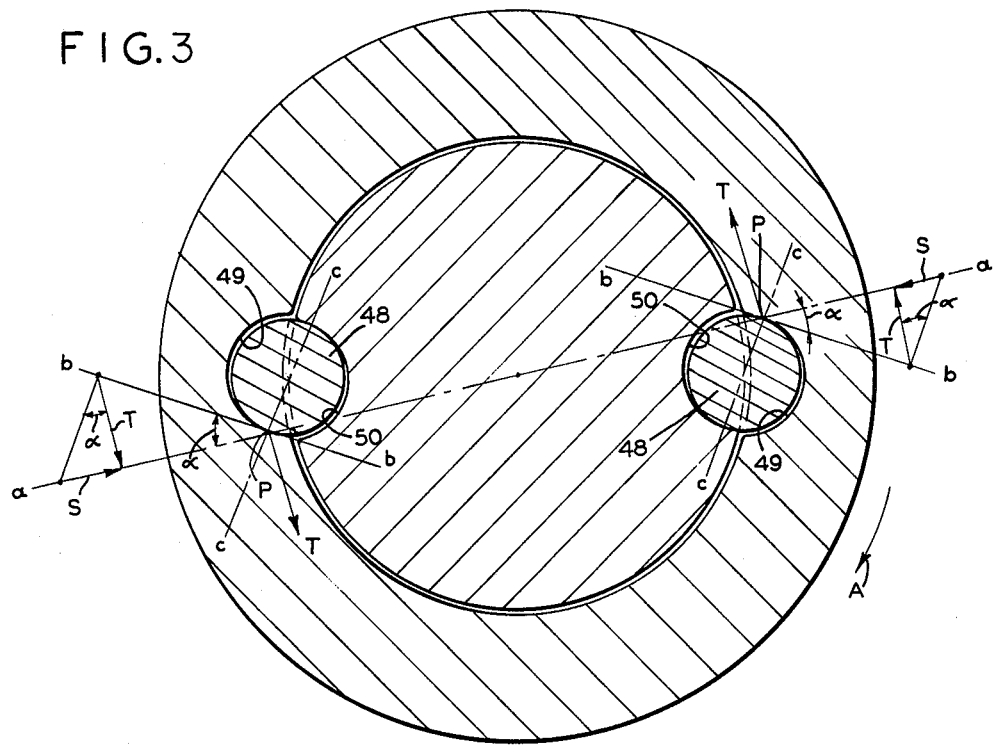
FIG. 3 is a furthermore enlarged cross-sectional detail view taken on line 4—4 in the FIG. 2 embodiment, illustrating the torque balancing effect of the torque transmitting members.

The enlarged detail cross section of FIG. 3 also illustrates in terms of force analysis, the balanced torque transmitting function of the loosely confined elements 48. Accordingly, with the drive torque from gear 22 acting clockwise in the direction of arrows A, the elements 48 will so adjust themselves relative to each other as well as with respect to the location of the pressure areas between them and the associated grooves, that both sets of bodies will transmit equal shares of the driving torque thereto.

Thus, with suitable tolerances provided between the sleeve member and the shaft, as well as between the torque transmitting bodies and the surrounding grooves, and with torque forces between the two sets of elements 48 in balance with each other, we find each set of these elements imparting to the shaft the identical tangential torque force T.

The torque force T, according to the force diagram in FIG. 3, results from the intersection of lines b—b, c—c, and a—a at the point of pressure contact P, where b—b and c—c intersect at right angles to each other with c—c tangential to element 48, determining the acute angle α enclosed between lines b—b and a—a, and where line c—c passes through the axis of the bodies 48, while line a—a passes through the axis of the shaft. Accordingly, with S being the radial equalizing force component, we find $S = T \cdot \tan \alpha$, and $$T = \frac{S}{\tan \alpha} = \text{Tangential torque force component in the diagram}$$

Figure 4:
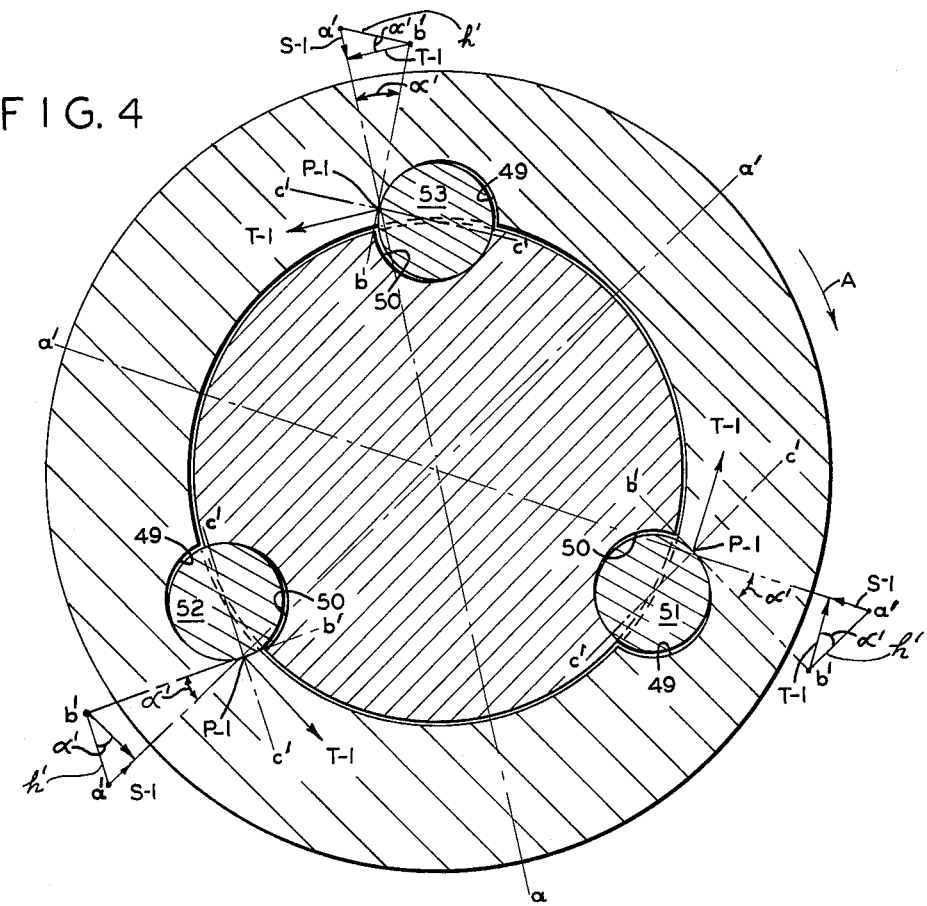
FIG. 4 is a cross-sectional view similar to FIG. 4, illustrating a triple set arrangement of the torque transmitting means.

FIG. 4 employs, instead of the minimum of two sets of torque transmitting elements of FIG. 3, three sets of torque transmitting elements 51, 52, 53, all three being substantially equally spaced from one another around the shaft axis and, because of their triple interbalance, capable of transmitting an accurately balanced driving torque.

There we find that each of the torque transmitting elements has a contact point P–1 at the intersection of lines a'—a', b'—b', and c'—c', where a'—a' extends diametrical of the shaft, b'—b' tangential to the torque-transmitting member and c'—c' diametrical thereto, with a'—a' and b'—b' enclosing the angle α'. In the force vector triangle with the hypotenuse h' normal to line b'—b', the acting forces accordingly resolve themselves into the tangential component T–1 and the equalizing component S–1, substantially in accordance with the manner set forth above in the resolution of forces in FIG. 3.

Figure 5:
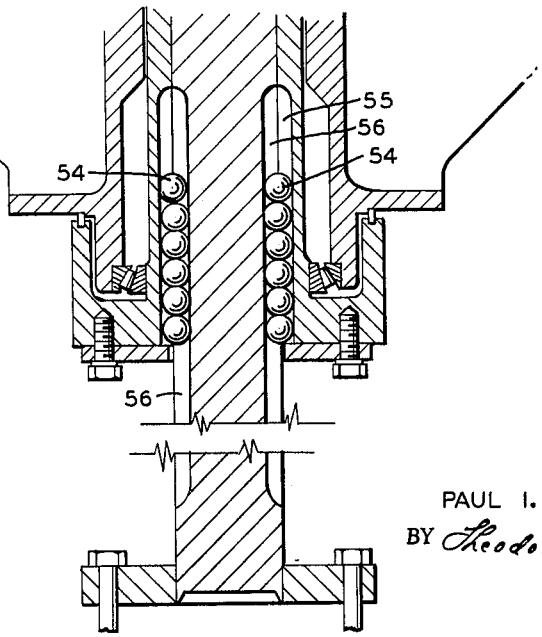
FIG. 5 is a fragmentary view resembling the embodiment of FIG. 2, featuring spherical torque transmitting bodies.

Referring to the arrangement in FIG. 5, the embodiment is similar to the one in FIGS. 1 and 2, except for the use of spherical elements or balls 54 to take the place of the previously described cylindrical elements 48. Such spherical elements serving as torque transmitting members may also act as antifriction bearing means during the axial shifting of the shaft. In this respect it should be noted that the inwardly facing grooves 55 in this embodiment comprise an extra groove length 56 allowing for compensatory rolling movement of the balls incident to the axial shifting of the shaft effected by the screw spindle and associated lifting means.

It will be understood that each of the elements described above, on two or more together, may also find a useful application in other types of drive mechanism differing from the ones described above.

While the invention has been illustrated and described as embodied in a drive mechanism for the sediment conveying rake structure in settling tanks, it is not intended to be limited to the details shown, since various modifications and structural changes may be made without departing in any way from the spirit of this invention.

I claim:
1. In a continuously operating sedimentation apparatus having a settling tank with overflow means at the top and sediment outlet means at the bottom, sediment conveying apparatus which comprises
  (a) a vertical cylindrical shaft carrying sediment raking means at its lower end portion, said shaft and raking means being rotatable for moving sediment to said outlet means, said shaft being mounted for substantial vertical shifting movement to adjust the raking means to varying working conditions, said shaft having a first set of at least two vertical grooves of a length at least equal to the desired vertical movement of the rake means, said grooves each being disposed entirely within the periphery of said shaft and being equally spaced about the shaft axis and each having semi-circular cross-sectional profile;
  (b) a drive gear structure concentrically associated with the upper end portion of said shaft, said drive gear structure having a downwardly depending tubular guide surface surrounding said shaft in axially slideable relationship with said shaft, said tubular guide surface having a second set of vertical grooves considerably shorter than said first set of grooves, said second set of grooves being endwise closed and of semi-circular cross-sectional profile complementary to the profile of said first set of grooves, said second set of grooves constituting with said first set of grooves respective composite cylindrical spaces, said second set of grooves being disposed entirely within the inner periphery of said tubular guide surface;
  (c) a torque-transmitting member of circular cross-section located in each said composite cylindrical space, each said torque transmitting member having a diameter slightly smaller than its respective composite cylindrical space, said torque transmitting members each being substantially confined against longitudinal movement in said second set of grooves, whereby said first set of grooves constitute tracks for the respective associated torque transmitting members when said shaft is axially shifted relative to said drive gear structure for raising and lowering the sediment conveying rake means in the tank, with said torque transmitting members adjusting themselves in tangential contact with their respective grooves to establish balanced drive torque transmission from the gear structure to said shaft, whereby resistance to the raising and lowering movement of the shaft under torque load is minimized;
  (d) a casing structure wherein said drive gear structure is mounted for rotation;
  (e) horizontal support structure extending transversely of the top portion of the tank for mounting said casing structure and supporting said shaft in vertical position;
  (f) and actuating means mounted atop said drive gear structure and connected to the upper end portion of said vertical shaft for raising and lowering said shaft and sediment raking means.

2. The apparatus according to claim 1, wherein each groove of said second set contains a row of cylindrical torque transmitting members.

3. Sediment conveying apparatus according to claim 1, wherein said first set and said second set each has three grooves equally spaced from one another to constitute respective composite cylindrical spaces, with each said torque transmitting member operating in each said composite cylindrical space.

4. The apparatus according to claim 1, wherein said casing structure has an upper wide portion surrounding the drive gear portion of said drive gear structure, and a lower narrower cylindrical portion extending downwardly from the underside of said upper wide portion and concentrically surrounding said downwardly depending tubular guide surface of the gear structure, wherein said gear structure is mounted in said casing structure by means of a pair of vertically spaced upper and lower combination bearings each capable of transmitting radial load as well as vertical thrust, the upper bearing being located adjacent the upper portion of said depending guide surface, the lower bearing being located adjacent the lower portion of said depending guide surface, and wherein at least a substantial portion of the vertical length of the torque transmitting members extends within the space between said vertically spaced bearings.

References Cited by the Examiner

UNITED STATES PATENTS

| 846,079 | 3/1907 | Yost | 64—23 |
| 1,220,483 | 3/1917 | Williams et al. | 64—23 |
| 2,360,817 | 10/1944 | Scott | 210—531 |
| 2,605,622 | 8/1952 | Anderson | 64—23 |
| 2,885,872 | 5/1959 | Burnette | 64—23 |
| 2,992,548 | 7/1961 | Walterscheid-Muller et al. | 64—23 |
| 3,002,400 | 10/1961 | Scott | 210—528 X |

FOREIGN PATENTS

| 725,687 | 3/1955 | Great Britain. |

REUBEN FRIEDMAN, *Primary Examiner.*

HERBERT L. MARTIN, *Examiner.*